(No Model.)
J. TEMLER.
RIVET FEEDING MECHANISM.
No. 575,136. Patented Jan. 12, 1897.
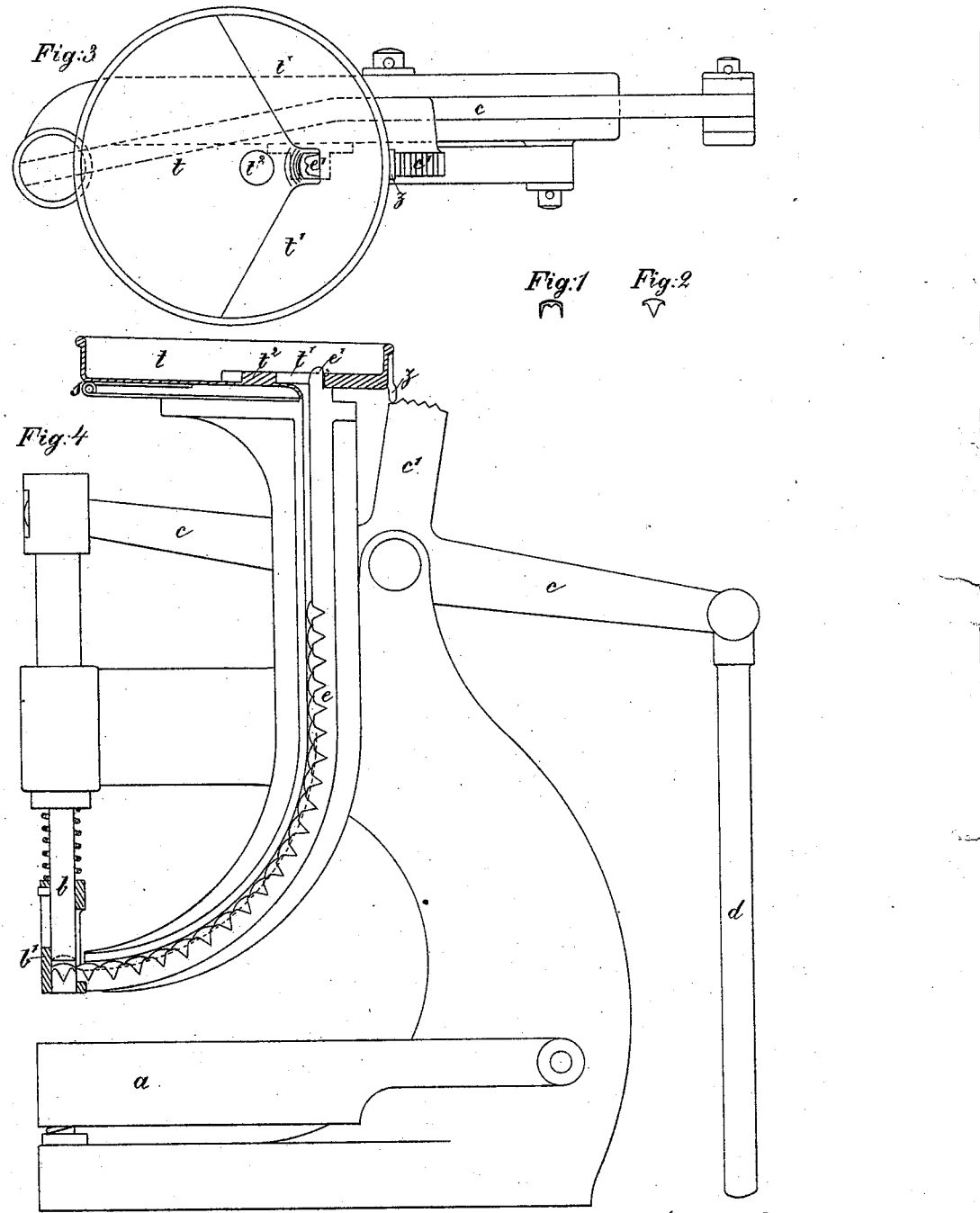

UNITED STATES PATENT OFFICE.

JOSEF TEMLER, OF WARSAW, RUSSIA, ASSIGNOR, BY MESNE ASSIGNMENTS, TO THE NATIONAL METAL EDGE BOX COMPANY, OF NEW JERSEY.

RIVET-FEEDING MECHANISM.

SPECIFICATION forming part of Letters Patent No. 575,136, dated January 12, 1897.

Application filed November 9, 1895. Serial No. 568,494. (No model.)

*To all whom it may concern:*

Be it known that I, JOSEF TEMLER, a subject of the Emperor of Russia, residing at Warsaw, in the Russian Empire, have invented a new and useful Improved Arrangement for Feeding the Rivets to the Required Point in Riveting-Machines, of which the following is a specification, reference being had to the accompanying drawings, wherein—

Figure 1 is a side view, and Fig. 2 an end view, of one of the rivets upon which the machine operates. Fig. 3 is a plan view, and Fig. 4 a vertical section, of a riveting-machine provided with the present improvements.

This invention has for its object an improvement in riveting-machines of that class which connect cardboard, leather, and the like by means of sheet-metal rivets consisting of a head, generally round or polygonal, and riveting-points attached to the opposite sides thereof. (See Figs. 1 and 2 of the accompanying drawings.)

The object of the improvement is automatically to conduct the rivets to the place in the machine where they are applied, and that in the same measure as they are used for making connections.

Such riveting-machines generally consist, as shown in Fig. 4 of the accompanying drawings, of an anvil $a$ for supporting the parts to be united by riveting, a plunger $b$ for forcing in the rivets, the plunger moving perpendicularly to the anvil $a$, and a sleeve $b'$, surrounding the plunger $b$ and capable of motion relatively thereto. The sleeve serves to hold the rivets and guide the same while being forced into the parts to be connected. The plunger $b$ is forced downward by a lever $c$. A connecting-rod $d$ (worked by pedal or by hand) imparts the requisite motion. For conducting the rivets to the point of application, that is to say, to the space under the plunger $b$ within the sleeve $b'$, a channel $e$ is provided. In the drawings this is represented straight in the upper part and curved in the lower, so the rivets are delivered from it under the plunger in the right position. The channel $e$, by reason of its length, can receive a number of rivets, thus serving as a magazine for the latter. In it the rivets are carried downward toward the point of application by gravity.

The object of the improvement in riveting-machines illustrated by the accompanying drawings is in a reliable manner to supply to the channel $e$ as many rivets from above as the same gives out from below.

On the upper end of the channel $e$ is provided a dish $t$, mounted on a hinge $s$, so that it is inclined toward the mouth of the channel $e$, as is shown in Fig. 4. The longitudinal guide-rib $e'$, by and upon which the rivets are guided down the channel $e$, projects slightly above the bottom of the dish $t$, and the front and sides are at that point slightly rounded. On the lever $c$ a toothed segment $c'$ is provided, with which engages a tooth $z$ on the dish $t$. Every time the lever $c$ rises and falls it causes the tooth $z$ to rise and fall also with a slight vibratory motion, and this motion is transmitted to the dish $t$. A raised part $t'$ on the dish $t$ partly surrounds the space in which the rivets lie. That part of the depression in the dish $t$ over which the rivets approach the mouth of the channel $e$ is inclined toward the latter. The edges of the raised portion $t'$ converge toward the mouth of the channel, where they are cut away to form a pocket inclosing the channel-mouth on three sides.

By the vibration of the dish $t$ produced at each up-and-down motion of the lever $c$ the rivets on the former receive a jumping motion, and by reason of the inclination of the dish-surface toward the channel $e$ the rivets travel toward the latter. A projection $t^2$ in front of the channel-mouth divides the solid stream of rivets into two columns, in each of which the rivets follow one another in regular succession, so that they singly reach the hereinbefore-mentioned depression of the dish. This depression is greatest in the middle, that is to say, in the forward part corresponding to the position of the rivet-heads in the channel $e$, and hence every rivet sliding along the curve tends to that point. The part guide-rib $e'$ of the channel $e$ projects above the dish-bottom, and this, together with the vibration of the dish $t$, causes the rivets to enter the channel in the proper position.

Having fully described my invention, what I claim, and desire to secure by Letters Patent of the United States, is—

1. In a riveting-machine, the combination with a rivet-feed channel, of a vibratory dish or tray, a raised portion having converging edges, a discharge-mouth communicating with the feed-channel and adjacent to the converging point of the edges of the raised portion, a guide-rib in said channel projecting above the surface of the raised portion and adjacent thereto, means for vibrating said tray, and a projection in front of said channel-mouth, substantially as described.

2. In a riveting-machine, the combination with a rivet-feed channel, of a vibratory dish or tray, a raised portion having converging edges, the edges at the point of convergence being cut away to form a pocket, a discharge-mouth communicating with the feed-channel and within the pocket formed by said converging edges, a guide-rib in said channel projecting above the surface of the raised portion and adjacent thereto, and means for vibrating said tray, substantially as described.

In testimony whereof I have signed this specification in the presence of two subscribing witnesses.

JOSEF TEMLER.

Witnesses:
HERNANDO DE SOTO,
C. F. ROSENCRANTZ.